UNITED STATES PATENT OFFICE.

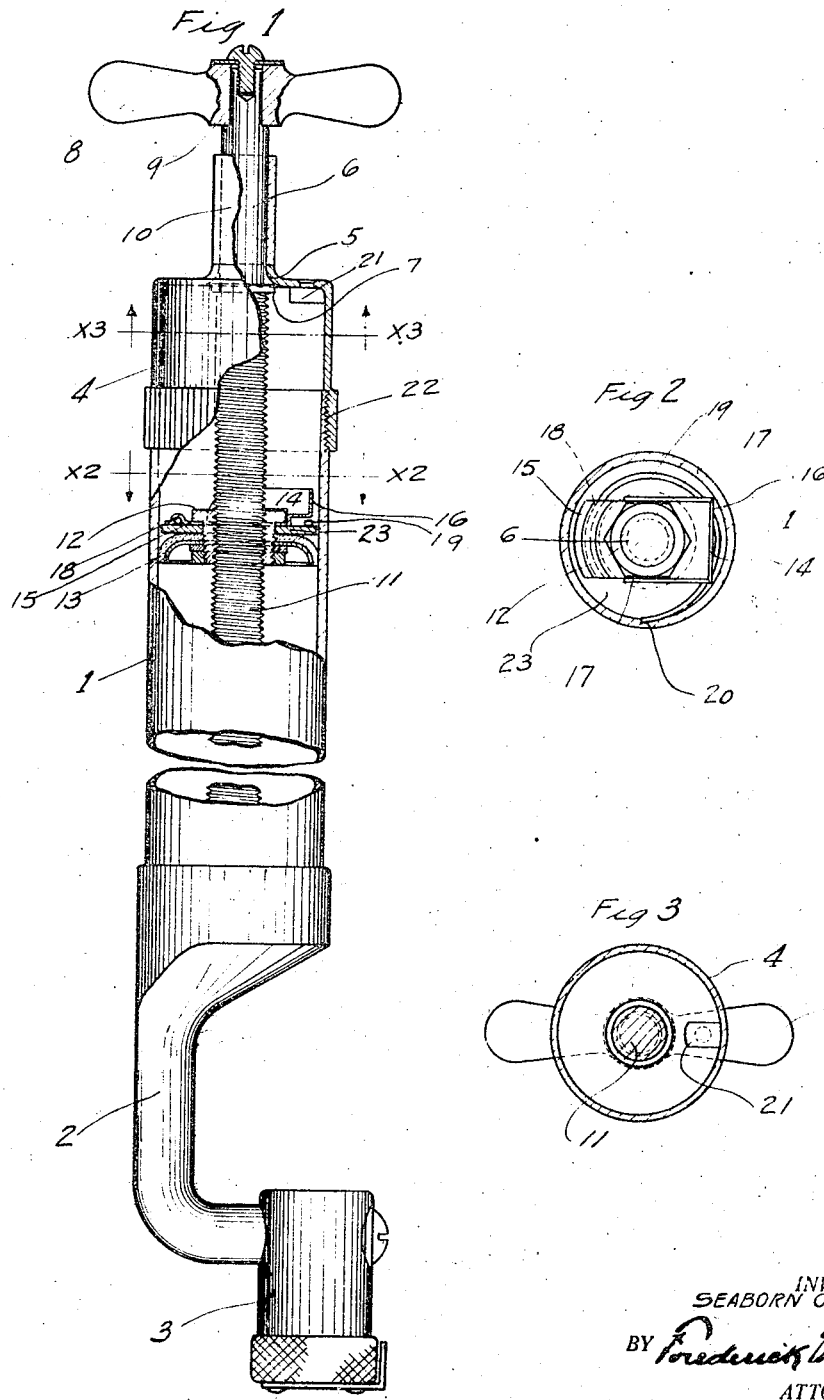

SEABORN C. JOINER, OF LOS ANGELES, CALIFORNIA, ASSIGNOR TO CRITZ MANUFACTURING COMPANY, OF SANTA MARIA, CALIFORNIA, A CORPORATION OF CALIFORNIA.

LUBRICANT GUN.

1,404,967.   Specification of Letters Patent.   Patented Jan. 31, 1922.

Application filed April 24, 1920. Serial No. 376,227.

*To all whom it may concern:*

Be it known that I, SEABORN C. JOINER, a citizen of the United States, residing at Los Angeles, in the county of Los Angeles and State of California, have invented a new and useful Lubricant Gun, of which the following is a specification.

This invention relates to lubricant guns of the character employed in forcing lubricant into a bearing or between members where friction is liable to occur.

An object of this invention is to make provision for unscrewing of the cylinder or cap by operation of the plunger rod.

Another object is to improve the device preventing rotation of the plunger.

Other objects and advantages will appear in the subjoined detailed description.

The accompanying drawings illustrate the invention.

Figure 1 is a broken side elevation, partly in mid section, of a lubricant gun constructed in accordance with the provisions of this invention.

Fig. 2 is a plan section on line indicated by $x^2$—$x^2$, Fig. 1.

Fig. 3 is an inverted plan section on line indicated by $x^3$—$x^3$, Fig. 1.

The lubricant gun comprises a cylinder 1 which is reduced at one end to form an angular conduit 2 that is provided with a pivotally mounted nozzle 3. This nozzle may be of any desired construction. The opposite end of the cylinder 1 is screw-threaded into a cap 4 provided with an axial opening 5 through which extends a plunger rod 6. The plunger rod is provided inside of the cap 4 with a shoulder 7 to engage with an inner face of the cap and thus prevent outward endwise movement of the plunger rod. The outer end of the rod 6 is provided with a handle 8, the hub 9 of which forms a shoulder adapted to engage the outer end of a sleeve 10 which surrounds the outer projecting end of the rod 6. The sleeve and hub limit endwise movement of the plunger rod inwardly. The plunger rod 6 is provided with screw threads 11, preferably left hand.

Engaging the screw threads 11 is a nut 12 of a plunger indicated in general by the character 13. The plunger 13 is provided with an abutment 14 which may be formed in any suitable manner. In this particular instance the abutment 14 comprises a collar 15 through which the nut 12 extends, and also comprises an upstanding flange 16 which engages opposite flat faces 17 of the nut 12. The collar 15 is provided at one side with a semi-circular or curved groove 18 in which is accommodated one end of a circular or curved spring member 19. The member 19 is firmly clamped against a washer 23 by the collar 15, said washer encircling the nut 12 and forming a portion of the plunger 13. The other end of the member 19 is adapted to engage a groove 20 extending longitudinally in the inner face of the cylinder 1. In Fig. 2 the member 19 is shown extending from the groove 18 to the groove 20 in a clockwise direction so that when the rod 11 is turned to the right, or clockwise, the member 19 will be held in the groove 20 and thus prevent rotation of the plunger 13. When the rod 11 is thus turned clockwise it causes the plunger 13 to move toward the conduit 2 so as to force lubricant, not shown, in front of the plunger through the conduit 2 and nozzle 3 to whatever receptacle, not shown, the nozzle 3 may be engaged with.

When the rod 11 is turned counter-clockwise, the plunger 13 is moved toward the cap 4 and is held against rotation by the pressure of the member 19 against the inner surface of the cylinder 1, and if the rod be turned sufficiently to move the plunger 13 into the cap 4. The member 19 engages the inner surface of the cap and the abutment 14 engages with an abutment 21 projecting from the inner face of the cap. When such engagement of the abutments 14, 21 occurs, the cap 4 may be removed by continuing to turn the rod 11 counter-clockwise, thus turning the cap 4 relative to the cylinder 1, the screw-threaded connection 22 between the cap and cylinder being right hand, in this instance.

It is to be understood that the invention is not limited to the exact details of construction shown in the drawings and above described, but that the invention also includes such changes and modifications as may lie within the spirit and scope of the invention as defined in the appended claims.

I claim:

1. In a lubricant gun, a cylinder, a cap screw-threaded onto one end of the cylinder, a rod passing through the cap and having a shoulder inside of the cap and having screw-threads, a plunger in the cylinder engaging the screw-threads, means to prevent rotation of the plunger relative to the cylinder, an abutment on the cap, and an abutment on the plunger adapted to engage the first abutment when the rod is turned.

2. In a lubricant gun, a cylinder having a longitudinal groove, a cap at one end of the cylinder, a rod passing through the cap and having a shoulder inside of the cap and having screw-threads, a plunger including a washer and a nut, the nut engaging the screw-threads, a collar between the nut and washer provided with a groove, and a member mounted in the last groove and having one end engaging the first groove.

3. In a lubricant gun, a cylinder having a longitudinal groove, a cap at one end of the cylinder, a rod passing through the cap and having a shoulder inside of the cap and having screw-threads, a plunger including a washer and a nut, a collar between the nut and washer, and a member clamped between the collar and washer and having one end engaging the groove.

4. In a lubricant gun, a cylinder, a cap screw-threaded onto one end of the cylinder, a screw-threaded rod extending through the cap into the cylinder, a plunger engaging the screw-threads of the rod, means to prevent turning of the plunger relative to the cylinder, and means operative by turning of the rod in one direction to unscrew the cap from the cylinder.

Signed at Los Angeles, California, this 9th day of April, 1920.

SEABORN C. JOINER.

Witnesses:
 GEORGE H. HILES,
 L. BELLE WEAVER.